United States Patent [19]

Morita et al.

[11] Patent Number: 4,694,456
[45] Date of Patent: Sep. 15, 1987

[54] INFORMATION SIGNAL REPRODUCING APPARATUS

[75] Inventors: Kazuyuki Morita; Toru Otsuka, both of Kanagawa, Japan

[73] Assignee: Sony Corporation, Tokyo, Japan

[21] Appl. No.: 811,822

[22] Filed: Dec. 20, 1985

[30] Foreign Application Priority Data

Dec. 28, 1984 [JP] Japan ................................. 59-277554

[51] Int. Cl.$^4$ ............................................. G06F 11/10
[52] U.S. Cl. ..................................... 371/38; 358/336; 360/38.1
[58] Field of Search ............................. 371/38, 39, 40; 358/336; 360/38.1

[56] References Cited

U.S. PATENT DOCUMENTS

| | | | |
|---|---|---|---|
| 4,249,253 | 2/1981 | Gentiti et al. | 371/38 |
| 4,455,635 | 6/1984 | Dieterich | 371/40 X |
| 4,467,373 | 8/1984 | Taylor et al. | 371/40 X |
| 4,562,577 | 12/1985 | Glover et al. | 371/38 |
| 4,577,237 | 3/1986 | Collins | 371/40 X |

*Primary Examiner*—Charles E. Atkinson
*Attorney, Agent, or Firm*—Lewis H. Eslinger; Alvin Sinderbrand

[57] ABSTRACT

An information signal reproducing apparatus comprises a memory for storing encoded digital data and error correction data, and a decoder for decoding the digital data, producing decoded digital data organized in blocks, and delivering the decoded digital data one block at a time. A data transmission controller controls the transmission of the digital data from the memory to the decoder, and an analog signal processor forms a reproduced analog information signal in accordance with each block of the decoded digital data. A data supply controller controls the supply of each block of the decoded digital data to the analog signal processor. An operation controller includes a first control for controlling the operation of the data transmission controller and the data supply controller so as to cause the decoder to perform trial decoding of the digital data, and a second control for controlling the operation of the data transmission controller and the data supply controller so as to cause the decoder to perform actual decoding of the digital data after the trail decoding is completed.

7 Claims, 6 Drawing Figures

INFORMATION SIGNAL REPRODUCING APPARATUS

BACKGROUND OF THE INVENTION

1. Field of the Invention

This invention relates generally to information signal reproducing apparatus, and more particularly, to apparatus for reproducing information signals recorded on a record medium in the form of digital data encoded together with data for error correction, wherein the digital data read out from the record medium are subjected to the error correction and decoded in order to be transformed into reproduced information signals.

2. Description of the Prior Art

There has been proposed a video disc having a spiral record track in for each turn of the disc a frame period segment of a video signal is recorded in such a manner as to be optically readable and from which a reproduced video signal of high quality can be easily obtained. The reproduction of the video signal from the video disc is performed by a video disc player in which the video disc is rotated at a predetermined rotating speed and the spiral record track on the video disc is scanned by an optical stylus formed with a light beam, such as a laser beam, provided in the video disc player, so that the video signal recorded in the spiral record track is read out.

In such reproduction of the video signal from the video disc, a reproduced video signal for a still picture can be obtained by reading one frame period segment of the video signal repeatedly from one of the turns of the spiral record track on the video disc. In this connection, there has been also proposed a system for obtaining video signals for reproducing still pictures together with audio signals for reproducing sound corresponding to the respective still pictures. In such a system, a unit audio signal corresponding to a frame period segment of the video signal for a still picture, that is, a still picture video signal of one frame period, is recorded in a plurality of turns of the spiral record track on the video disc preceding the turn of the spiral record track in which the still picture video signal is recorded. In a reproducing operation, the unit audio signal is first read and stored in a memory device, and then the corresponding still picture video signal is reproduced repeatedly to obtain a still picture and simultaneously the unit audio signal stored in the memory device is read from the memory to produce the sound for the reproduced still picture. In such a case, to reduce the number of the turns of the spiral record track used for recording the unit audio signal, each unit audio signal is compressed in time base when it is recorded and is then expanded during time base in reproduction. To obtain a reproduced sound satisfactory to practical use from the recorded unit audio signal that is compressed in time base on a large scale, each unit audio signal may be recorded in the form of audio digital data encoded in accordance with the PCM(pulse code modulation) coding.

On the video disc having the spiral record track in which the still picture video signals and the audio digital data corresponding to the respective still picture video signals are recorded, as shown in FIG. 1, for example, a recorded area AR is provided where audio digital data SFA are recorded in a plurality of turns of the spiral record track (each turn is indicated with T) and a recorded area VR is provided where a still picture video signal V of one frame period is recorded in each of three successive turns of the spiral record track and which follows the recorded area AR. A plurality of such combinations of recorded areas AR and VR may be provided successively with different audio digital data and different still picture video signals.

In reproducing signals from such a video disc, initially the plural turns of the spiral record track in the recorded area AR are successively scanned by the optical stylus so that the audio digital data SFA recorded therein are read out and stored in the memory device, and then one of the successive three turns at the center in the recorded area VR is repeatedly scanned by the optical stylus so that the still picture video signal V recorded therein is reproduced repeatedly. Thus, a still picture is obtained and simultaneously the audio digital data SFA stored in the memory device is read from the memory device and decoded through expansion in time base so that the sound for the reproduced still picture is obtained.

Such audio digital data SFA as mentioned above can also be contained in a quasi-video signal that can be recorded on the video disc and which has horizontal and vertical synchronous signals in similar to those in the still picture video signal. Assuming that the nth (n is a positive integer) one of horizontal periods successive to a vertical synchronous signal SV in each frame period of this quasi-video signal is represented by the nH, the audio digital data SFA contained in the quasi-video signal are positioned, as shown in FIG. 2, in successive ones of 240 horizontal periods from 23H to the 262H in the first field period and successive 240 horizontal periods from 285H to 524H in the second field period in each frame period.

In the quasi-video signal shown in FIG. 2, the horizontal synchronous signal is not shown and address data Fn are contained in 17H and 18H in the first field period in each frame period, which indicates the track turn number for a turn of the spiral track in which each frame period segment of the quasi-video signal is to be recorded For example, less than thirty-three frame periods of the quasi-video signal continues to be recorded in the recorded area AR, and therefore a unit quasi-video signal is formed with less than thirty-three frame period segments each containing the audio digital data SFA. As for each unit quasi-video signal containing less than thirty-three frame periods, in 21H and 22H in the first field period of the first frame period, header mark data Hm are positioned as indicated with a dot-dash line in FIG. 2, and in 525H in the second field period of the final frame period, trailer mark data Tm are positioned as indicated also with a dot-dash line in FIG. 2.

The audio digital data SFA contained in each unit quasi-video signal which is formed with less than thirty-three frame periods as described above are provided by encoding audio information data through an interleave in accordance with a cross-interleave technique to which the audio information data is subjected together with an error correcting code added thereto so that error correction is effectively carried out on the occasion of decoding. Such encoding of the audio information data to produce the audio digital data SFA is so performed that a predetermined coding format is established. In this predetermined coding format, for example, the audio digital data SFA which are contained in each of the frame periods of the unit quasi-video signal are encoded into successive 480 data segments DS each formed with 16 bytes (128 bits) and set to be contained in one horizontal period, as shown in FIG. 3 (In FIG. 3, the ends of the respective data segments DS are aligned vertically for the convenience of illustration). These successive 480 data segments DS as a whole constitute a data frame DF, and each data segment DS contains leader mark data Lm of one byte at the beginning end thereof and a data portion of fifteen bytes following the leader mark data Lm.

Then, as shown, in FIG. 4, less than thirty-three successive data frames DF constitute a data group DU in which each data frame DF corresponds to each of the frame periods of the unit quasi-video signal. At the begining end of each data frame DF, track turn number data Ut of thirty-two bytes representing the number of the turns of the spiral track used for recording the data group DU to which the data frame DF belongs are provided, and at the first half of the first data frame DF, control program data Pd are provided so that audio information data can be processed in accordance with the control program data Pd on the occasion of reproduction.

In such encoding of the audio digital data SFA as to constitute the coding format as mentioned above, the interleave to which the audio digital data SFA are subjected is carried out in such a manner that, for example, a plurality of data blocks each formed with thirty-two bytes are partitioned and a change of bit arrangement among a predetermined number of selected ones of the data blocks is achieved within each data group DU containing less than thirty-three data frames. That is, each data group DU in its entirety constitutes a unit of data wherein the interleave to which the audio digital data SFA are subjected is completed.

Accordingly, when the quasi-video signal containing the audio digital data SFA is read from the spiral record track on the video disc to reproduce the audio digital data SFA and the reproduced audio digital data SFA are decoded to reproduce the audio signal, the data group DU containing the less than thirty-three successive data frames DF is stored entirely in the memory device. Then, the predetermined number of the data blocks each formed with thirty-two bytes are selectively read from the memory device to be supplied to a decoder and the error correction is performed through a de-interleave carried out for solving the interleave for the data blocks supplied to the decoder, so that decoded audio information data corresponding to one data block are obtained from the decoder. These decoded audio information data are subjected to digital to analog conversion in a predetermined processing time (for example, 6 milliseconds) and consequently a reproduced analog audio signal segment corresponding to one data block is obtained.

After that, whenever one of the data blocks is newly read from the memory device in which the data group DU is stored entirely to be supplied to the decoder, the error correction is performed through the de-interleave carried out for solving the interleave for the data blocks supplied to the decoder so as to produce newly decoded audio information data corresponding to one data block. These decoded audio information data are also subjected to the digital to analog conversion in the predetermined processing time and consequently a new analog audio signal segment corresponding to one data block is reproduced. Is such a manner as mentioned above, the reproduced audio signal segments each corresponding to one data block of the audio information data are successively obtained and, as a result, a continuous analog audio signal is reproduced.

In reproducing the audio signal from the audio digital data SFA read from the video disc in such a manner as aforementioned, if the audio digital data SFA, which are selectively read one data block at a time from the memory device in which the data group DU of the audio digital data SFA is stored entirely, contain a certain bit error which prevents the error correction for the audio digital data SFA in the decoder from being carried out in a specific manner, that is, a situation wherein the error correction in the decoder is unable to be carried out is brought about in a specific manner, the reproduction of the audio signal ceases and the reproduced audio signal can not be obtained thereafter. This results in the problem that, in the case where sound is reproduced in accordance with the reproduced audio signal, the sound is stopped suddenly and undesirably.

OBJECTS AND SUMMARY OF THE INVENTION

Accordingly, it is an object of the present invention to provide an improved information signal reproducing apparatus for decoding digital data encoded together with data for error correction and for reproducing an information signal in accordance with decoded digital data.

Another object of the present invention is to provide an information signal reproducing apparatus for decoding digital data encoded with data for error correction and for reproducing an information signal in accordance with decoded digital data, which can avoid the aforementioned problem encountered with the prior art for decoding audio digital data read from a video disc on which the audio digital data are recorded with a video signal for a still picture and obtaining an audio signal reproduced in accordance with decoded audio digital data.

According to an aspect of the present invention, there is provided an information signal reproducing apparatus comprising memory means for storing digital data which are encoded with data for error correction in a plurality of blocks decoding means for decoding the digital data read from the memory means through an error correction circuit to produce decoded digital data, such that the decoded digital data are delivered successively one block at a time. Also provided is a data transmission control means for controlling the transmission of the digital data from the memory means to the decoding means, analog information signal processing means for forming a reproduced analog information signal in accordance with each of the blocks of the decoded digital data supplied successively thereto and, data supply control means for controlling supply of each block of the decoded digital data from the decoder to the analog information signal processing means. An operation control means is provided that include a first controlmeans that controls the operation of the data transmission control means and the operation of the data supply control means so as to cause the decoding means to perform trial decoding of the digital data read from the memory means, and second control means for controlling the operation of the data transmission control means and the operation of the data supply control means so as to cause the decoding means to perform actual decoding of the digital data read from the memory means.

The decoding means is further operative to deliver a first detection output representing a situation wherein the error correction for the digital data read from the memory means is unable to be carried out and a second detection output representing the completion of decoding of the digital data read from the memory means. The first control means included in the operation control means is operative to cause the data transmission control means to transmit the digital data read from the memory means successively to the decoding means, to cause the data supply control means to be inoperative, to detect a malfunctioning state wherein the situation represented by the first detection output obtained from the decoding means is brought about in a specific manner on the strength of the first detection output, and to cause the data transmission control means to continue to supply the digital data read from the memory means to the decoding means until the second detection output is obtained from the decoding means when the malfunctioning state is not detected. Further, the second control means included in the operation control means is operative to cause the data transmission control means to transmit the digital data read from the memory means intermittently to the decoding means after the second detection output has been obtained from the decoding means and to cause the data supply control means to operate, so that the reproduced analog information signal formed in accordance with each of the blocks of the decoded digital data delivered successively from the decoding means is obtained from the analog information signal processing means.

In the information signal reproducing apparatus thus constituted in accordance with the present invention, prior to the operating condition for actual decoding wherein the digital data read from the memory means are supplied intermittently to the decoding means, the decoded digital data are obtained one block at a time from the decoding means, and the reproduced analog information signal formed in accordance with each of the blocks of the decoded digital data from the decoding means is obtained. In this fashion the operating condition for trial decoding is established wherein the digital data read from the memory means are supplied successively to the decoding means, so that it is checked whether or not the situation exists wherein the error correction for the digital data read from the memory means can not be carried out for the whole of digital data read from the memory means. The operating condition for actual decoding is established only when it has been confirmed through the trial decoding that the situation wherein the error correction for the digital data read from the memory means is unable to be carried out Accordingly, the situation is avoided wherein the error correction for the digital data read from the memory means is unable to be carried out during the reproduction of the analog information signal and consequently the reproduced information signal can not be obtained thereafter.

The above and other objects, features and advantages of the present invention will become apparent from the following detailed description taken in conjunction with the accompanying drawings.

DESCRIPTION OF THE PREFERRED EMBODIMENT

Now, an embodiment of information signal reproducing apparatus according to the present invention will be described in detail with reference to the accompanying drawings hereinafter.

Figure 1:
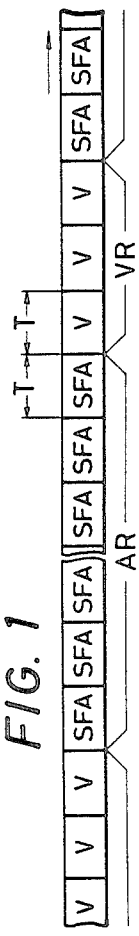
FIG. 1 is an illustration used for explaining an example of an information recording manner for a video disc.
Figure 2:
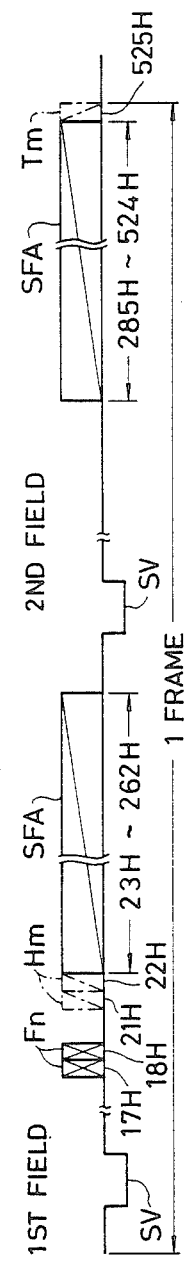
FIG. 2 is a schematic waveform diagram used for explaining audio digital data recorded on a video disc.
Figure 3:
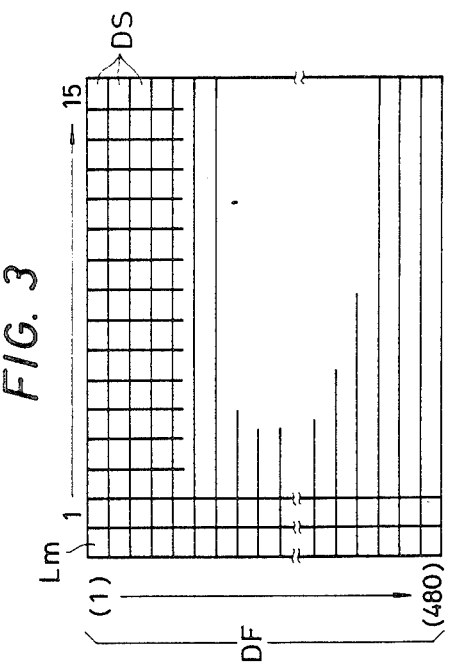
FIGS. 3 and 4 are illustrations showing coding formats of audio digital data recqrded on a video disc.
Figure 4:
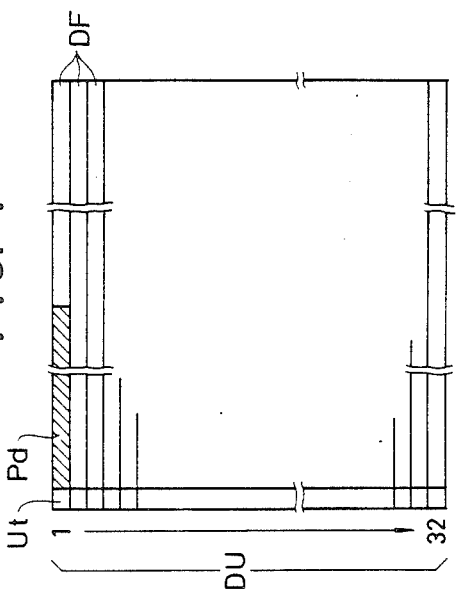
Figure 5:
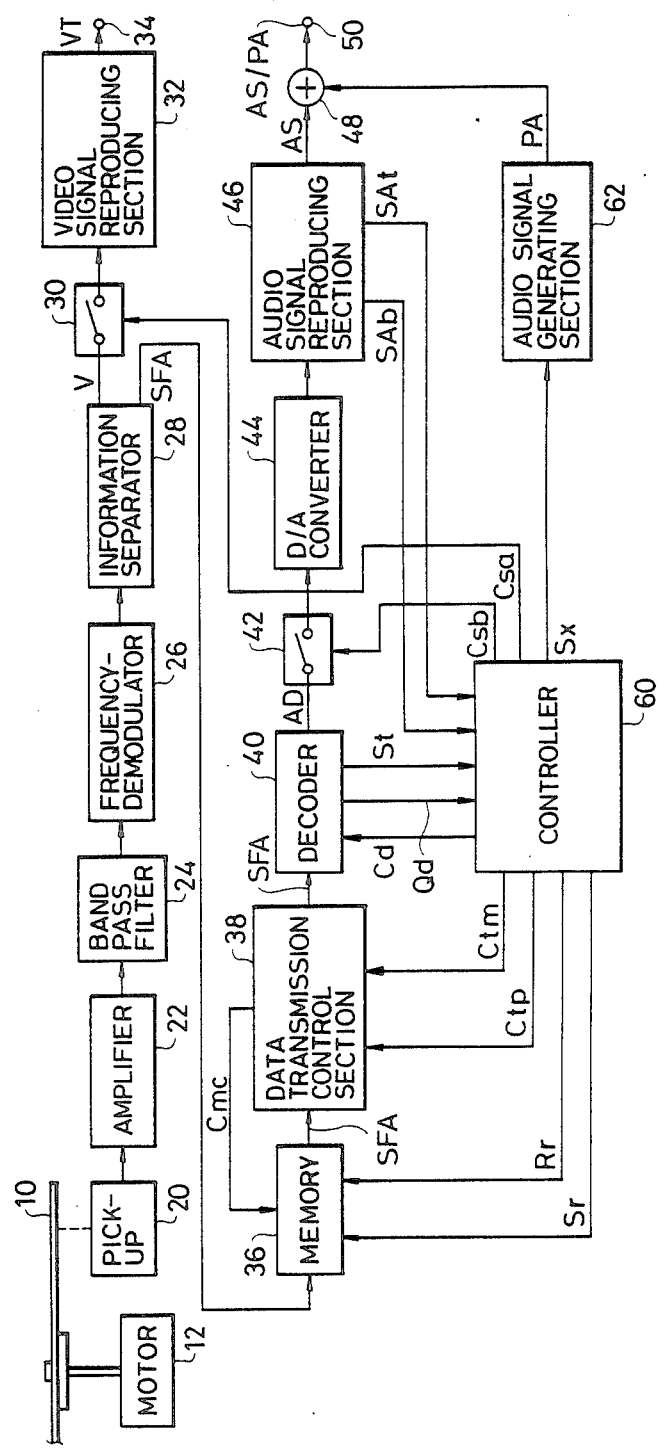
FIG. 5 is a block diagram showing one embodiment of information signal reproducing apparatus according to the present invention.

FIG. 1 shows an example of the information signal reproducing apparatus according to the present invention. This example is constituted to reproducing video and audio signals from a video disc 10 on which the quasi-video signal containing the audio digital data SFA and the still picture video signal V, as described above with reference to FIGS. 1 to 4, are recorded in the form of frequency-modulated (FM) signals in a spiral track in such a manner that each of frame period segments of the quasi-video signal and still picture video signal V is recorded in one turn of the spiral record track.

The video disc 10 is rotated by a motor 12 at rotating speed of, for example, 1800 rpm. A pick-up 20, which forms a portion of this example, is provided to face the record surface of the video disc 10 on which a spiral record track is formed and to read therefrom both the quasi-video signal containing the audio digital data SFA and the still picture video signal V recorded in the form of the frequency-modulated signals, respectively. The output obtained from the pick-up 20 is supplied through an amplifier 22 and a band pass filter 24 to a frequency-demodulator 26. Then, the demodulated output from the frequency-demodulator 26 is supplied to an information separator 28, and the audio digital data SFA and the still picture video signal V are independently derived from the information separator 28. The still picture video signal V is supplied through a switch 30 to a video signal at which a reproduced video signal VT representing a still picture is obtained.

On the other hand, the audio digital data SFA derived from the information separator 28 are supplied to a memory 36. In the memory 36, the audio digital data SFA are stored in the form of the data group DU which contains less than thirty-three sucessive data frames DF, in accordance with a writing command signal Sr from a controller 60, and the audio digital data SFA stored in the memory 36 are read therefrom in accordance with a reading command signal Rr from the controller 60. The audio digital data SFA read from the memory 36 are supplied through a data transmission control section 38 to a decoder 40 one data block at a time in a predetermined manner. The data transmission control section 38 receives a transmission control signal Ctp or Ctm from the controller 60 and supplies a memory control signal Cmc to the memory 36 in response to the transmission control signal Ctp or Ctm, so as to read selectively each data block of the audio digital data SFA from the memory 36.

In the decoder 40, the audio digital data SFA are subjected to the de-interleave which is carried out, for solving the interleave provided on the audio digital data SFA, in response to successive supply of each data block of the audio digital data SFA thereto in accordance with a decoding control signal Cd from the controller 60, so as to be decoded through the error correction resulting from the de-interleave, and decoded audio digital data SFA, that is, audio information data AD are derived from the decoder 40 successively one data block at a time. Further, the decoder 40 is operative to generate a first detection signal Qd representing that the error correction for the audio digital data SFA is unable to be carried out therein and a second detection signal St representing that the decoding of the audio digital data SFA has been completed and therefore all data blocks of the audio information data AD have been obtained, and to supply these first and second detection signals Qd and St to the controller 60.

Each data block of the audio information data AD derived from the decoder 40 is supplied through a switch 42 to a digital to analog converter (D/A converter) 44, and the digital to analog converter 44 converts each data block of the audio information data AD into an analog signal and supplies the analog signal to an audio signal reproducing section 46. In the audio signal reproducing section 46, each data block of the audio information data AD in the form of analog signal is processed to be a reproduced audio signal AS having the original time base. Then, the reproduced audio signal AS thus obtained is derived through an adder 48 to an output terminal 50. Further, the audio signal reproducing section 46 is operative to generate a third detection signal SAb representing that the reproduced audio signal AS corresponding to each data block of the audio information data AD has been obtained, and a fourth detection signal SAt representing that the reproduced audio signal AS corresponding to all data blocks of the audio information data AD has been obtained, and to supply these third and fourth detection signals SAb and SAt to the controller 60.

The controller 60 supplies switch control signals Csa and Csb to switches 30 and 42, respectively, in addition to the writing command signal Sr, reading command signal Rr, transmission control signals Ctp and Ctm, and the decoding control signal Cd supplied as aforementioned. Further, the controller 60 is operative to detect a malfunctioning state in which the error correction for the audio digital data SFA unable to be carried out in the decoder 40 is in response to the successive supply of each data block of the audio digital data SFA through the data transmission control section 38, and to supply a control signal Sx to an audio signal generating section 62 when the malfunctioning state is detected. The audio signal generating section 62 generates a predetermined audio signal PA and supplies the same to the adder 48 when the control signal Sx is supplied to the audio signal generating section 62 from the controller 60. This audio signal PA is obtained at the output terminal 50 in place of the reproduced audio signal AS.

In the reproduction of still pictures and sound accompanying with the respective still pictures performed with the embodiment constituted as mentioned above, firstly a unit quasi-video signal formed with less than thirty-three frame period segments each containing the audio digital data SFA is read from the video disc 10. Consequently the audio digital data SFA are obtained from the information separator 28 to be supplied to the memory 36 and the data group DU containing less than thirty-three successive data frames DF of the audio digital data SFA is stored in the memory 36 one data frame DF at a time in accordance with the writing command signal Sr supplied also to the memory from the controller 60. Hereon, the switch 30 is kept in the ON state with the switch control signal Csa from the controller 60.

Then, the still picture video signal V of one frame period is read repeatedly from the video disc 10 and accordingly the still picture video signal V of one frame period is obtained repeatedly from the information separator 28. The switch 30 is also kept in the ON state by the switch control signal Csa from the controller 60 so as to supply the still picture video signal V from the information separator 28 to the video signal reproducing section 32. Consequently, the reproduced video signal VT representing a still picture is derived from the output terminal 34.

Simultaneously with the above, the reading command signal Rr and the transmission control signal Ctp from the controller 60 are supplied to the memory 36 and the data transmission control section 38, respectively, and the data transmission control section 38 supplies the memory control signal Cmc to the memory 36 in response to the transmission control signal Ctp so that the data blocks, each of which is formed with thirty-two bytes, of the data group DU of the audio digital data SFA are successively read from the memory 36 and supplied to the decoder 40. In the decoder 40 to which the respective data blocks of the audio digital data SFA are supplied successively, each data block of the audio digital data SFA is stored in a memory contained in the decoder 40, and the audio digital data SFA are subjected to the de-interleave and decoded through the error correction resulting from the de-interleave in accordance with the decoding control signal Cd from the controller 60. During this decoding of the audio digital data SFA, the decoder 40 operates to detect the situation wherein the error correction for the audio digital data SFA is unable to be carried out and to supply the first detection signal Qd to the controller 60 when such a situation is detected. Hereon, the switch 42 is kept in the OFF state with the switch control signal Csb from the controller 60 so as to prevent the decoded output from the decoder 40 from being supplied to the digital to analog converter 44.

The controller 60 operates to detect the malfunctioning state in which the error correction for the audio digital data SFA is unable to be carried out in response to the successive supply of the data blocks of the audio digital data SFA to the decoder 40, on the strength of the first detection signal Qd from the decoder 40, and to supply the control signal Sx to the audio signal generating section 62 to cause the same to generate the predetermined audio signal PA when the malfunctioning state is detected. Accordingly, where the malfunctioning state is detected at the controller 60, the predetermined audio signal PA is obtained at the output terminal 50 in place of the reproduced audio signal AS.

In such a case that the predetermined audio signal PA is obtained at the output terminal 50, the data group DU of the audio digital data SFA, which is supplied from the memory 36 to the decoder 40 successively one data block at a time, includes such bit errors as to be incapable of being corrected in the decoder 40, and as a result, the reproduced audio signal AS is not obtained from the audio signal reproducing section 46. Accordingly, in this embodiment, the arrangement is such that the predetermined audio signal PA is derived from the output terminal 50 instead of the reproduced audio signal AS. The predetermined audio signal PA may be selected so as to represent some warning information.

To the contrary, in the case where the malfunctioning state is not detected at the controller 60, the decoder supplies the second detection signal St to the controller 60 when the whole data group DU of the audio digital data SFA supplied through the data transmission control section 38 has been subjected to the de-interleave and decoded through the error correction procedure. The controller 60 to which the second detection signal St is supplied from the decoder 40 supplies the transmission control signal Ctm to the data transmission control section 38 in place of the transmission control signal Ctp and changes the switch control signal Csb to keep the switch 42 in the ON state, so that the reproduced audio signal AS corresponding to the data group DU of the audio digital data SFA stored in the memory 36 is obtained at the output terminal 50.

In such a manner as described above, prior to the actual reproducing operation for obtaining the reproduced audio signal AS from the data group DU of the audio digital data SFA stored in the memory 36, the trial decoding operation is performed for checking whether a malfunctioning state is present, and only when it has been confirmed as a result of the trial coding operation that the malfunctioning state is nothing wrong with the data group DU of the audio digital data SFA stored in the memory 36, the actual decoding of the data group DU of the audio digital data SFA is achieved at the decoder 40 to obtain the reproduced audio signal AS.

In the trial decoding operation, since it is not required to provide the time occupied on the process for obtaining the reproduced audio signal from the audio information data AD of one data block derived from the decoder 40, the decoding of the audio digital data SFA is carried out continuously and consequently the trial decoding operation can be completed in a short time.

The transmission control signal Ctm supplied to the data transmission control section 38 from the controller 60 causes the data transmission control section 38 to supply the memory control signal Cmc generated in response to the transmission control signal Ctm to the memory 36 so as to read selectively a predetermined number of data blocks in the data group DU of the audio digital data SFA stored in the memory 36 to be supplied to the decoder 40. In the decoder 40 to which the predetermined number of data blocks of the audio digital data SFA are supplied through the data transmission control section 38, each data block of the audio digital data SFA is stored in the memory contained in the decoder 40, and then the predetermined number of data blocks of the audio digital data SFA are subjected to the de-interleave and decoded through the error correction procedure in accordance with the decoding control signal Cd from the controller 60, so that the decoded audio digital data SFA of one data block, that is, the audio information data AD of one data block are derived from the decoder 40.

On this occasion, since the switch 42 is kept in the ON state, the audio information data AD of one data block derived from the decoder 40 are supplied to the digital to analog converter 44 to be converted into an analog signal. The analog signal obtained from the digital to analog converter 44 is supplied to the audio signal reproducing section 46 to be processed for reproduction, and the reproduced audio signal AS corresponding to the audio information data AD of one data block is obtained from the audio signal reproducing section 46 to be fed through the adder 48 to the output terminal 50.

Then, the audio signal reproducing section 46 supplies the third detection signal SAb to the controller 60 when the reproduced audio signal AS corresponding to the audio information data AD of one data block has been fully obtained.

The controller 60 supplies again the transmission control signal Ctm to the data transmission control section 38 in response to the third detection signal SAb from the audio signal reproducing section 46, so as to cause the data transmission control section 38 to read a new data block in the data group DU of the audio digital data SFA from the memory 36 and to supply the new data block to the decoder 40. In the decoder 40 to which the new data block is supplied through the data transmission control section 38, the new data block is stored in the memory contained in the decoder 40, and then the predetermined number of data blocks of the audio digital data SFA including the new data block are subjected to the de-interleave and decoded through the error correction resulting from the de-interleave, so that new audio information data AD of one data block are derived from the decoder 40.

The new audio information data AD of one data block derived from the decoder 40 are also converted into an analog signal at the digital to analog converter 44. This analog signal obtained from the digital to analog converter 44 is supplied to the audio signal reproducing section 46 to be processed for reproduction, and the reproduced audio signal AS corresponding to the new audio information data AD of one data block is obtained from the audio signal reproducing section 46 to be fed through the adder 48 to the output terminal 50. In this case also, the audio signal reproducing section 46 supplies the third detection signal SAb to the controller 60 when the reproduced audio signal AS corresponding to the new audio information data AD of one data block has been fully obtained.

The controller 60 further supplies the transmission control signal Ctm to the data transmission control section 38 in response to the third detection signal SAb supplied from the audio signal reproducing section 46, so as to cause the data transmission control section 38 to read a further new data block in the data group DU of the audio digital data SFA from the memory 36 and to supply the further new data block to the decoder 40. From the decoder 40 to which the further new data block is supplied, further new audio information data AD of one data block are derived in the same manner as mentioned above. Then, the reproduced audio signal AS corresponding to the further new audio information data AD of one data block is obtained from the audio signal reproducing section 46 to be fed through the adder 48 to the output terminal 50, and the third detection signal SAb is supplied again to the controller 60 from the audio signal reproducing section 46.

After that, whenever one data block of the audio digital data SFA is supplied through the data transmission control section 38 to the decoder 40, new audio information data AD of one data block are derived from the decoder 40 and the reproduced audio signal AS corresponding to the new audio information data AD of one data block is obtained successively.

When all data blocks of the data group DU of the audio digital data SFA stored in the memory 36 have been supplied through the data transmission control section 38 to the decoder 40 and decoded therein and consequently the reproduced audio signal AS corresponding to all data blocks of the audio information data AD has been obtained from the audio signal reproducing section 46, the audio signal reproducing section 46 supplies the fourth detection signal SAt to the controller 60. The controller 60 ceases to deliver the respective control signals therefrom in response to the fourth detection signal SAt so that the production of the reproduced video signal VT representing a still picture and the reproduced audio signal AS accompanying thereto is finished.

In such a manner as described above, where the reproduced audio signal AS is obtained from the audio digital data SFA, firstly the trial decoding operation is carried out for checking whether the error correction for the audio digital data SFA is can be carried out, and then the actual decoding operation for the reproduced audio signal AS is achieved only when it has been confirmed through the trial decoding operation that the error correction for the audio sigital data SFA can be carried out the desired manner. Accordingly, the situation is avoided wherein the error correction for the audio digital data SFA is unable to be carried out in the desired manner during the reproducing operation and consequently the reproduced audio signal AS can not be obtained thereafter.

Figure 6:
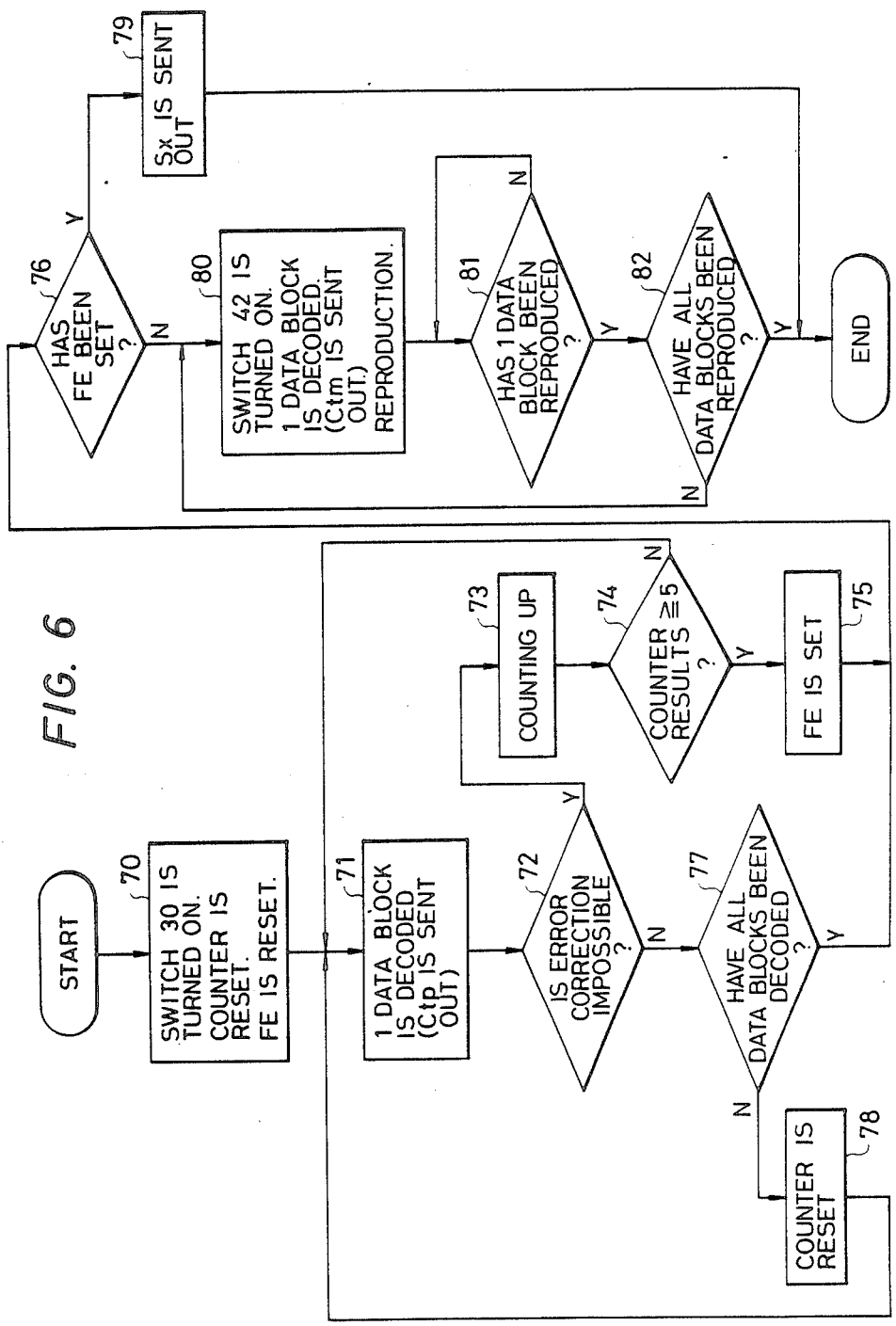
FIG. 6 is a flow chart showing an example of a control program for a microcomputer in a controller employed in the embodiment shown in FIG. 5.

The controller 60 effecting the control operation as described above is constituted with, for example, a microcomputer having a counter therein, and the operating program of such a microcomputer constituting the controller 60 is carried out in accordance with, for example, a flow chart as shown in FIG. 6.

In the case of the flow chart shown in FIG. 6, after the start, in a process 70, a counter contained in the microcomputer is reset, an error flag FE which is further described later is reset, and the switch 30 is turned on with the switch control signal Csa. Next, in a process 71, the transmission control signal Ctp is sent out to the data transmission control section 38 and the switch 42 is kept in the OFF state with the switch control signal Csb. Under such a condition, the data group DU of the audio digital data SFA stored in the memory 36 is supplied through the data transmission control section 38 to the decoder 40 successively one data block at a time, and in the decoder 40, the audio digital data SFA are subjected to the de-interleave and decoded through the error correction resulting from the de-interleave, so that the decoded audio digital data SFA of one data block, that is, the audio information data AD of one data block are derived from the decoder 40.

Then, in a decision 72, it is checked, on the strength of the first detection signal Qd from the decoder 40, whether the situation is present wherein the error correction for the audio digital data SFA is unable to be carried out. When the situation is present wherein the error correction for the audio digital data SFA is unable to be carried out, the step proceeds to a process 73 wherein the counter is caused to count up by one and then it is checked whether the results of the counter is equal to or more than five in a decision 74.

When the results of the counter is not equal to nor more than five, the step returns to the process 71 wherein new audio information data AD of one data block are derived from the decoder 40, and further the step proceeds to the decision 72 wherein such check as described above is performed repeatedly.

To the contrary, when the results of the counter is equal to or more than five, it is understood that the malfunctioning state as aforementioned has been brought about in the decoder 40 and the error flag EF is set in a process 75, and then the step proceeds to the decision 76. As a result of this, the error flag EF indicates the malfunctioning state in the set state.

On the other hand, when it is judged in the decision 72 that the situation is present wherein the error correction for the audio digital data SFA is unable to be carried out is not brought about, it is checked whether the second detection signal St from the decoder 40 is obtained or not, that is, whether all data blocks of the data group DU of the audio digital data SFA have been decoded or not in a decision 77. When all data blocks of the data group DU of the audio digital data SFA have not been decoded yet, the counter is reset in a process 78 and then the step returns to the process 71. In the process 71, further new audio information data AD of one data block are derived from the decoder 40, and after that the step proceeds to the decision 72 wherein such check as described above is performed repeatedly.

As described above, since the counter is reset in the process 78, the results of the counter which are equal to or more than five indicate that the situation wherein the error correction for the audio digital data SFA is unable to be carried out is brought about at least five times successively in response to the supply of each data block of the audio digital data SFA to the decoder 40, and in this example, if the error correction for the audio digital data SFA is unable to be carried out at least five times successively the malfunctioning state is defined.

When it is judged in the decision 77 that all data blocks of the data group DU of the audio digital data SFA have been decoded, the step proceeds to the decision 76. In the decision 76, it is checked whether the error flag EF has been set or not. When the error flag EF has been set, in a process 79, the control signal Sx is supplied to the audio signal generating section 62 so as to cause the audio signal generating section 62 to generate the predetermined audio signal PA, and the control operation is finished. Accordingly, in such a case, the reproduced audio signal AS is not obtained.

To the contrary, when the error flag EF has not been set, the step proceeds to process 80. In the process 80, the switch 42 is turned on with the switch control signal Csb, and the transmission control signal Ctm is sent out to the data transmission control section 38 in place of the transmission control signal Ctp. Under such a condition, the predetermined number of data blocks in the data group DU of the audio digital data SFA stored in the memory 36 are supplied through the data transmission control section 38 to the decoder 40, and in the decoder 40, the predetermined number of data blocks of the audio digital data SFA are subjected to the de-interleave and decoded through the error correction resulting from the de-interleave, so that the audio information data AD of one data block are derived from the decoder 40. Further, the audio information data AD of one data block derived from the decoder 40 is converted to be an analog signal in the digital to analog converter 44 to be supplied to the audio signal reproducing section 46, and the reproduced audio signal AS corresponding to the audio information data AD of one data block is obtained from the audio signal reproducing section 46.

Next, in a decision 81, it is checked whether the third detection signal SAb from the audio signal reproducing section 46 is obtained or not, that is, whether the reproduced audio signal AS corresponding to the audio information data AD of one data block has been fully obtained or not. When the reproduced audio signal AS corresponding to the audio information data AD of one data block has not been fully obtained yet, the check is repeated in the decision 81. To the contrary, when the reproduced audio signal AS corresponding to the audio information data AD of one data block has been fully obtained, the step proceeds to a decision 82.

In decision 82, it is checked whether the fourth detection signal SAt from the audio signal reproducing section 46 is obtained or not, that is, whether the reproduced audio signal AS corresponding to all data blocks of the audio information data AD derived from the decoder 40 has been fully obtained or not. When the reproduced audio signal AS corresponding to all data blocks of the audio information data AD derived from the decoder 40 has not been fully obtained yet, the step returns to the process 80 to repeat the above mentioned operation in and after the process 80. On the other hand, when the reproduced audio signal AS corresponding to all data block of the audio information data AD derived from the decoder 40 has been fully obtained, the control operation is finished.

What is claimed is:

1. An information signal reproducing apparatus comprising:
   memory means for storing encoded digital data and error correcting data;
   decoding means responsive to said memory means for decoding said digital data, producing decoded digital data organized in blocks, and delivering the decoded digital data one block at a time,
   data transmission control means for controlling transmission of the digital data from said memory means to said decoding means;
   analog information signal procesing means responsive to said decoding means for forming a reproduced analog information signal in accordance with each of the blocks of the decoded digital data supplied thereto,
   data supply control means for controlling supply of each block of the decoded digital data from said decoder means to said analog information signal processing means, and
   operation control means including first control means for controlling said data transmission control means to transmit the digital data read from said memory means successively to said decoding means and inactivating said data supply control means, so as to cause said decoding means to perform trial decoding of the digital data, and second control means for controlling said data transmission control means to transmit the digital data read from said memory means intermittently to said decoding means and activating the data supply control means, so as to cause said decoding means to perform actual decoding of the digital data after said trial decoding is completed.

2. An information signal reproducing apparatus according to claim 1, wherein said decoding means is further operative to deliver a first detection output representing a situation wherein the error correction for the digital data read from said memory means is unable to be carried out and a second detection output representing the completion of decoding of the digital data, said first control means included in said operation control means is further operative to detect, on the strength of said first detection output, a malfunctioning state wherein the situation represented by said first detection output is brought about in a specific manner and to cause said data transmission control means to continue to transmit the digital data to said decoding means until said second detection output is obtained from said decoding means when the malfunctioning situation is not detected, and said second control means included in said operation control means is further operative to cause said data transmission control means to start transmitting the digital data intermittently to said the decoding means after said second detection output is obtained from said decoding means.

3. An information signal reproducing apparatus according to claim 2, wherein said analog information signal processing means comprises means for supplying to said operation control means a third detection output indicating that the reproduced analog information signal corresponding to each block of the decoded digital data obtained from said decoding means has been obtained and a fourth detection output indicating that the reproduced analog information signal corresponding to a predetermined number of blocks of the decoded digital data obtained from said decoding means has been obtained.

4. An information signal reproducing apparatus according to claim 2, wherein said data supply control means comprises a switch connected between said decoding means and said analog information signal processing means and controlled with a control signal supplied from said operation control means.

5. An information signal reproducing apparatus according to claim 4, wherein said analog information signal processing means comprises digital to analog converting means for converting each of the blocks of the decoded digital data obtained from said decoding means into an analog signal and signal reproducing means for forming the reproduced analog information signal from said analog signal obtained from said digital to analog converting means.

6. An information signal reproducing apparatus according to claim 3 further comprising analog signal generating means for producing a predetermined analog information signal, said analog signal generating means being controlled by said operation control means so as to produce the predetermined analog information signal when the reproduced analog information signal is not obtained from said analog information signal processing means.

7. An information signal reproducing apparatus according to claim 2, wherein said operation control means comprises a microcomputer device provided in common to at least said memory means, decoding means, data transmission control means, analog information signal processing means and data supply control means.

* * * * *